(No Model.)
J. V. GREEN.
POTATO PLANTER.
No. 422,016. Patented Feb. 25, 1890.
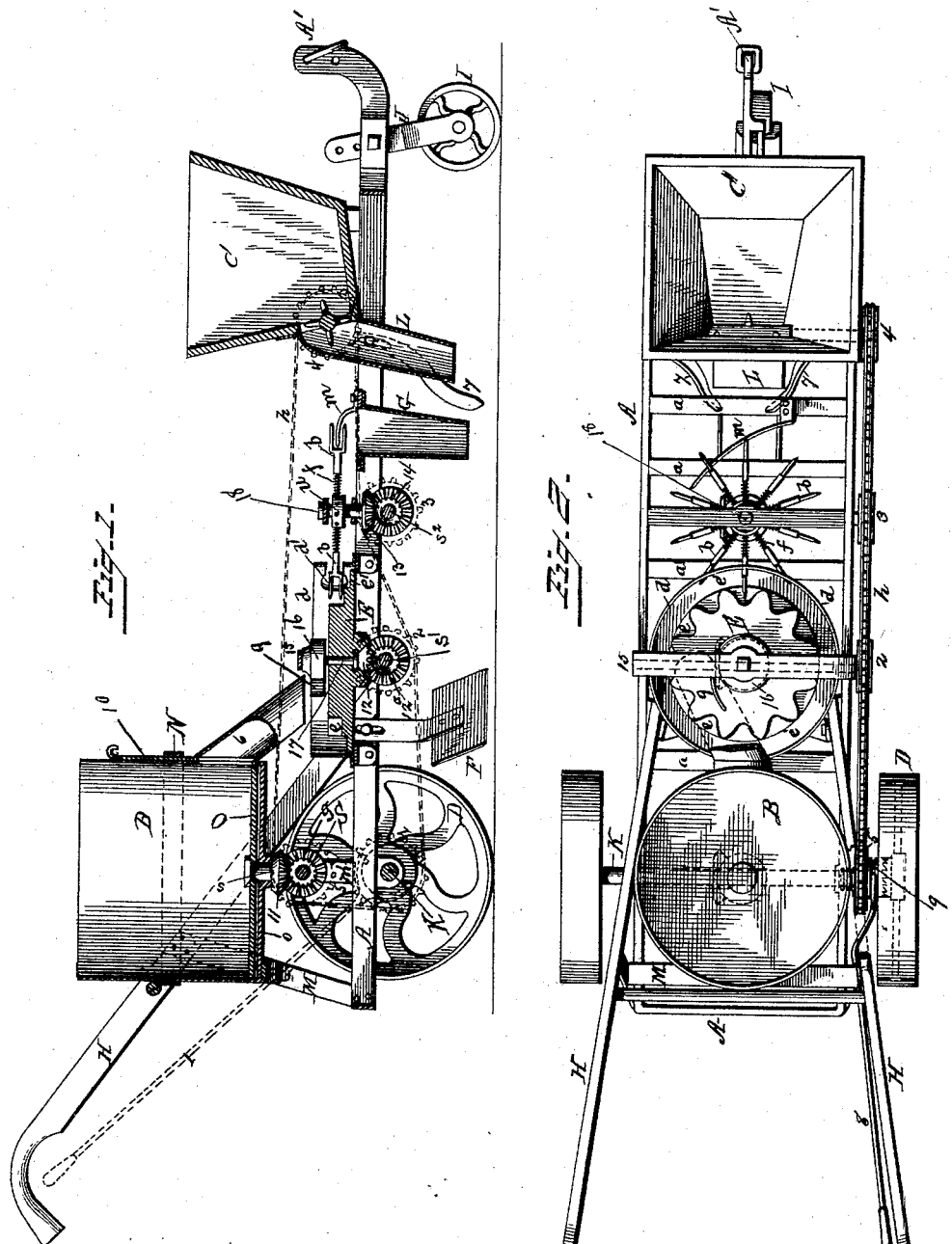
Witnesses
Inventor
John V Green,
By his Attorney
Mortimer Whitehead,

UNITED STATES PATENT OFFICE.

JOHN V. GREEN, OF WILBURTHA, NEW JERSEY.

POTATO-PLANTER.

SPECIFICATION forming part of Letters Patent No. 422,016, dated February 25, 1890.

Application filed June 20, 1889. Serial No. 314,946. (No model.)

*To all whom it may concern:*

Be it known that I, JOHN V. GREEN, a citizen of the United States, residing at Wilburtha, in the county of Mercer and State of New Jersey, have invented certain new and useful Improvements in Potato-Planters; and I do hereby declare the following to be a full, clear, and exact description of the invention, such as will enable others skilled in the art to which it appertains to make and use the same.

My invention relates to that class of agricultural implements known as "potato-planters," and has for its object dropping fertilizer in the furrow, planting single pieces of potatoes at regular and uniform distances by means of power communicated from the drive-wheels by a continuous chain, and properly covering the same. These several operations I obtain in one simple and strong machine, the parts of which are readily adjustable and removable, and the complete machine may be easily drawn in operation by one horse and manipulated by one man.

The description and operation of my improved potato-planter are shown in the following specification, and the construction and arrangement of its parts illustrated in the accompanying drawings, in which—

Figure 1 is a longitudinal sectional view, and Fig. 2 is a top plan view, of my potato-planter.

The leading features in the construction and operation of this implement are the seed-receiver, composed of the parts E, e, e', and d, and the seed distributer or picker, consisting of the parts b, f, and u, and these may be operated in connection with any of the forms of fertilizer-distributers and seed-hoppers which will admit of substantially the same gearing described herein and shown in the drawings.

The construction and arrangement which I prefer consist of a frame A, rectangular in form, of cast or wrought iron braced by cross-pieces a a, and having its forward end terminating in a single bar A', which is bent up and provided with holes to carry a link or clevis as a draft-point. From the frame A, near its rear part, is journaled or supported in any convenient way the axle K, upon which turn the drive-wheels D, the inner side of the hub of one of which is ratcheted to engage a ratchet-sleeve 9, which fits loosely on the axle and is thrown in or out of gear by means of a rod 8, the lower end of which is forked and clutches the sleeve. Keyed or otherwise secured to the sleeve 9 is a sprocket-wheel 1, upon which and the sprockets 2, 3, 4, and 5 travels an endless sprocket-chain h, by which motion is communicated to the several parts of the implement. Fitting snugly between the handles H and above the wheel D is the potato-hopper B, braced in its position by the handles H and by the band M, the ends of which are bolted to the sides A. The hopper is also supported on either side by the uprights m', (only one of which is shown,) which are secured to the sides A and to the bottom of the hopper, and, in addition to being supports, furnish bearings for the shaft S, which carries the bevel-pinion g. To stiffen and strengthen the hopper, which is preferably made of sheet-iron, a metal band N may encircle it at a point midway of its height.

The hopper B is provided with a bottom o and a rotary feed-disk O, the former revolving with the bevel-pinion 11, which is connected with it by means of the short vertical shaft s. The bottom o is stationary, and is secured to the sides of the hopper in any suitable manner. The revolving feed-disk O carries the pieces of potatoes into the opening in the chute 6, by which they are conveyed to the seed-receiver. The size of the opening in the chute may be regulated by the gate 10. The pieces of potatoes fall upon the revolving disk E, which is constructed or stamped from sheet metal, formed with a shoulder e' about its circumference and provided with a series of recesses or cups e e. Surrounding the disk and at a short distance therefrom, and secured rigidly to two of the cross-pieces a a, is a rim or collar d, which has an opening d' to permit the ingress and egress of the forks b. Upon the shoulder e' will drop pieces of potatoes that do not go into the cups e, and the rim or collar d will prevent them from falling to the ground. Below the center of the disk and at the lower end of the vertical shaft 17 is the bevel-pinion 12, which, by meshing with the bevel-pinion 12ª, secures the revolution of the disk. Over the center of the disk and at the upper end of the vertical shaft 17 is a loosely-fitting collar 16, which is prevented from turning by means of the strap 15, to which it is secured. Said strap also furnishes a bearing for the upper end of the shaft 17. To the collar 16, at a slight distance above the unbroken face of the disk, is fixed an arm 9, which, as the disk revolves, serves to scrape or push the potatoes into the cups $e$.

The arrangement of the bevel-pinions 13 and 14 on the shafts 18 and $s^2$, respectively, corresponds with the arrangement of the pinions 12 and $12^a$ on the shafts $s'$ and 17; but they revolve in the opposite direction, as the chain passes on the upper side of the sprocket 3, instead of under it, as with sprocket 2. The vertical shaft 18 carries a hub $u$, from which extends radially a series of picker-arms each composed of a rod $f$, a spiral spring surrounding the rod, and a fork $b$, having a hollow tang which fits over the rod. As the disk E revolves in one direction, the pickers revolve in the opposite direction and are so arranged with reference to the cups $e$ that each fork enters a cup and impinges a piece of potato.

As a rule, but one piece of potato will enter a cup at a time; but should two or more pieces drop into a cup the spring on the rod $f$ will permit the fork to yield, so that but one piece of potato will be taken therefrom. As a fork carrying a piece of potato reaches a point over the opening in the top of the spout G, it engages with or passes over a curved rod $m$, thus pushing the potato from the fork and permitting it to drop into the ground through the spout G.

Near the forward end of the frame A is placed the fertilizer-hopper, in the construction and operation of which I claim nothing new. From the sides of the frame A, just back of the fertilizer-spout I, extend two coverers 7, for the purpose of throwing a little dirt over the fertilizer in the furrow to prevent its harmful contact with the seed. The guide-wheel I and standard J are of the usual construction, and are not a part of my invention. Covers F serve to cover the potatoes in the furrow.

What I claim as my invention, and desire to secure by Letters Patent, is—

1. In a potato-planter, the combination of a seed-hopper having a revolving and a stationary bottom, a seed-receiver consisting of a revolving horizontal disk with recesses therein, a seed-picker composed of a series of radial forks, a rod for pushing the seed from the forks, with a supporting-frame, a drive-wheel, and suitable gearing, substantially as herein described.

2. In a potato-planter, the combination of a seed-hopper having a revolving and a stationary bottom, a seed-receiver consisting of a revolving horizontal disk with recesses therein, a seed-picker composed of a series of forks, a rod for pushing the seed from the forks, a fertilizer dropper and coverer, with a supporting-frame, a drive-wheel, and suitable gearing, substantially as herein set forth.

3. The combination of a seed-hopper and a seed-receiver consisting of a horizontal disk with recesses therein and provided with means by which the seed are pushed into the recesses, a seed-picker composed of a series of forks arranged radially, a rod for pushing the seed from the forks, a fertilizer dropper and coverer, and a seed-coverer, with a supporting-frame, sprockets, bevel-pinions, and endless chain, arranged as herein set forth, and for the purposes described.

In testimony whereof I affix my signature in presence of two witnesses.

JOHN V. GREEN.

Witnesses:
RANDOLPH H. MOORE,
W. S. SHARP.